Figure 1:
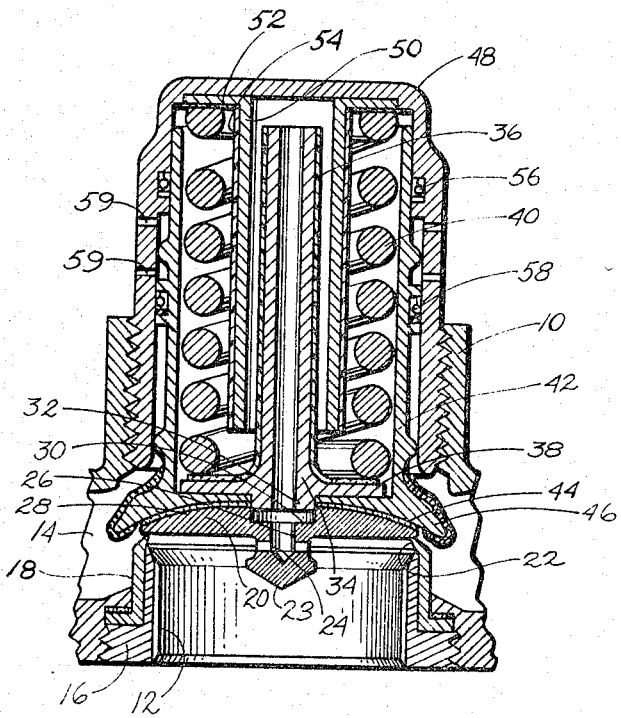

Nov. 1, 1966  R. L. VICK  3,282,289

HOT GAS RELIEF VALVE

Filed Sept. 28, 1964

INVENTOR.
RALPH L. VICK
BY
*Robert Smith*
ATTORNEY

United States Patent Office 3,282,289
Patented Nov. 1, 1966

3,282,289
HOT GAS RELIEF VALVE
Ralph L. Vick, Granada Hills, Calif., assignor to The Bendix Corporation, North Hollywood, Calif., a corporation of Delaware
Filed Sept. 28, 1964, Ser. No. 399,621
11 Claims. (Cl. 137—375)

The invention relates to relief valves, and more particularly to relief valves for use with extremely hot gases as a working fluid. In designing a relief valve for use in service where extremely hot gases are used, it frequently is a serious problem to design a valve which will operate satisfactorily in such an environment, even for a matter of a few minutes. Such a valve may be part of the overall package relied upon to insure success in a missile-launching venture costing thousands of dollars; therefore, the approach has been to design such valves almost without regard to cost, either in the use of expensive materials, or in the use of production methods and tolerances. Unfortunately, the use of relatively expensive materials and methods is not a guarantee of success. For example, it would be usual for this type of application to use seals which are of a relatively expensive, all-metal type, which also generate high friction. Obviously, the high friction is not a desirable characteristic. Costly spring materials, such as Inconel-X, are normally used. Often, a seal and spring are combined in a metal-welded bellows configuration using Inconel-X or Rene–41 on the second stage of two-stage valve designs. In the application for which the present inventon was devised, the metal bellows approach was found unsuccessful due to blow-out failure at high temperature and pressure. The metal piston seal approach was partially satisfactory as a second stage; however, the overall design was rendered inadequate through a contamination problem which developed in the first stage. It was determined that the single-stage valve approach was preferable since it does not have a contamination problem inasmuch as all metering is in a hot area which tends to keep contaminants in suspension.

It has been known for many years that conventional relief valves often do not open fully until the pressure has risen substantially above that necessary to start the opening. It has also been known that one reason for slow opening is that the flow of fluid through the valve may create forces tending to close it and that by modifying the valve construction to alter the direction of flow of fluid, some improvement in the opening characteristic can be obtained. In my co-pending application Serial No. 181,850 filed March 23, 1962, now Patent 3,217,740, issued November 16, 1965, there is disclosed a design for a relief valve for use in hydraulic systems in which the reaction forces of fluid passing through a barely open orifice tends to further move the poppet off its seat rather than to permit the fluid flow to actually produce forces tending to close it. It has been found that similar problems exist with the hot gas relief valve and that these problems may be dealt with in much the same manner. It is, therefore, an object of the present invention to provide a hot gas relief valve which will operate satisfactorily for a desired period of time.

It is another object of the present invention to provide a hot gas relief valve which accomplishes the above objective and which is comparatively inexpensive to produce, while remaining highly reliable in operation.

It is a further object of the present invention to provide a simple and reliable hot gas relief valve that opens widely in response to a pressure only slightly above the pressure required to initiate opening movement.

Figure 2:
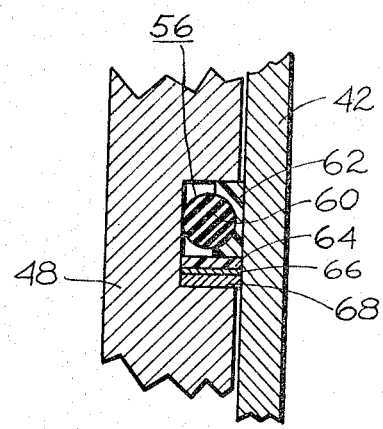

Other objects and advantages will become apparent from consideration of the following specification taken in connection with the accompanying drawing, in which
FIGURE 1 is a cross-sectional view of a valve incorporating my invention.
FIGURE 2 is an enlarged cross-sectional view of a portion of FIGURE 1.

Referring now to the drawing, a casing is shown at numeral 10 including an inlet passage 12 and an outlet passage 14. Inserted into housing 10 and serving as an inlet passageway and a retainer for member 18 is an annular member 16 which may be formed of a corrosion-resistant steel. Member 16 is also coated with a heat-resistant coating, such as zirconium oxide, in the inlet passage 12, where it is directly exposed to the high-temperature inlet gas. Member 16 is fastened to casing 10 either by being threaded therewith or through other suitable fastening means. An annular valve seat member 18 is carried on member 16 and is also attached to the casing 10 through a gasket seal to effectively seal chamber 12 from chamber 14. Member 18 is formed of a high-temperature material, such as molybdenum-titanium alloy. A poppet valve member 20 is arranged to close on the sharp annular valve seat portion 22 of member 18. Poppet member 20, which may be made of the same material as member 18, includes an inwardly extending projection 23 for deflecting the hot gas contaminants toward the outlet port and thus protecting the small orifices 24 from being blocked. The small orifices 24 lead to a passageway 26 on the opposite, or outer, side of poppet member 20. These orifices and the chamber to which they lead form a damping arrangement which prevents valve instability. The outer surface of poppet member 20 includes a partially spherical surface 28 and a hollowed-out guide section 30. Carried in guide section 30 is a projecting portion 32 of a cylindrical member 34, the interior of which constitutes a continuation of the passageway 26. Cylindrical member 34 may be made of steel or other suitable material. It has a sleeve 36 of insulating material, which may be Teflon, tightly secured to its outer surface. Member 34 also includes a radially extending section 38 which constitutes one of two retainer sections for a spring 40.

A piston member 42 is carried on poppet member 20 and includes a partially spherical surface in mating relationship with a corresponding surface of poppet 20. Since piston 42 is not made of high-temperature material, it is desirable to include an insulating gasket 44 between piston 42 and poppet member 20 which limits the heat flow from poppet member 20 into the spring chamber and also seals the mating juncture between the two pieces to form a barrier between chambers 12 and 14. Piston 42 includes a skirt 46 which extends downwardly past the valve seat 22 and is therefore exposed to high-temperature gas when the valve is open. The portions of this skirt which are immediately in contact with the hot gas on the downstream side of the valve seat are coated with zirconium oxide or other suitable heat-resistant material which prevents erosion of the steel skirt and also operates to reduce heat flow into the spring chamber. By deflecting the gas passing the valve seat 22 downwardly as it leaves the seat, a reactive component is produced which tends to aid the pressure in inlet passage 12 in moving the poppet member 20 in an opening direction. Other portions of the housing in the outlet passage 14 which are exposed to the hot gas flow past seat 22 may be coated with zirconium oxide, as necessary.

Threadedly engaged with housing 10 is a cap member 48. A cylindrical baffle member 50 extends from the top of the cap member 48 into the interior of said cap in such manner as to surround concentrically the cylindrical member 34. Baffle 50 also includes an annular flange 52 which serves as the upper retainer for spring 40. A Teflon sleeve 54 is also secured to the outside surface of cylindrical baffle member 50.

From the foregoing, it will be apparent that although poppet member 20, cylindrical member 34, and piston 42 are all separate members, once assembled, they move essentially as a unit. The mating, partially spherical surfaces of piston 44 and poppet member 20 serve to keep these two members in the desired axial alignment. Similarly, the depression 30 in poppet 20 and the mating projection on cylindrical member 34 hold member 34 in axial alignment with poppet member 20. The poppet assembly is free to move upwardly under pressure from the inlet chamber 12 by an amount equal to the clearance between the top of piston member 42 and the inside surface of the top of cap 48. Since the radius at valve seats 22 is comparatively large, very small axial movement of the poppet assembly is necessary in order to provide a very substantial metering area.

In considering the operation of the above-described valve structure, it will first be assumed that hot gas is present in the inlet passageway 12 but at a pressure insufficient to open the poppet. Some of this gas will, however, flow through ports 24 into chamber 26 through the hollow interior of cylindrical member 34 down the passageway formed between members 34 and 50, and into the chamber containing spring 40. In this chamber, this gas is held in an essentially static condition since it is effectively blocked from flowing to the outlet port 14 by means of seal 56. A similar seal 58 prevents exhaust pressure from flowing to the exterior through orifices 59 and balances the seat area so that a variation in exhaust pressure does not change the setting of the valve.

These seals are shown in greater detail in FIGURE 2 and are very similar except that seal 56 is located in a stationary outside member and must permit an internally positioned member to slide relative to itself while seal 58 is positioned on the internal piston member 42 where it seals to the outside against a stationary member within which it moves. Seal 56 is located in an internal groove in cap member 48. The seal itself consists of a number of parts including an annular rubber O-ring 60 which is held in position by means of a sealing ring 62 which is preferably of polytetrafluoroethylene material (Teflon) which is in direct contact with the piston member 42. An additional polytetrafluoroethylene ring 64 may be included, and this in turn is backed up by means of a pair of metal sealing rings 66 and 68. It will be observed that only a small proportion of the seal 56 which is in contact with piston member 42 is made of metal. Most of the contacting material is the polytetrafluoroethylene material which has very high self-lubricating properties, thereby providing for a minimum of friction. Inasmuch as the essential sealing is accomplished by the combination of members 60, 62 and 64, metal members 66 and 68 may actually be split, thereby substantially reducing the amount of friction which they exert. In a high-temperature application, the polytetrafluoroethylene material has a tendency to soften and flow somewhat, and the metal seals or back-up rings 66 and 68 force the members 62 and 64 to generally retain their desired shape.

As pressure increases in inlet passage 12, a value is reached at which the gas pressure in the chamber carrying spring 40 acting downwardly against the poppet assembly plus the force exerted by spring 40 is sufficient to resist the force in the inlet passage acting against the lower side of poppet valve 20, and the poppet valve 20 begins to open. Gas then flows rapidly across seat 22 into outlet passage 14, where it is deflected downwardly by means of a skirt 46. The fluid flowing in this downward direction will exert a reactive force having a significant component acting upwardly, thereby tending to aid the inlet pressure in forcing poppet member 20 open. Inasmuch as this arrangement permits the spring 40 to exert a comparatively low force, this reactive force helps to cause the poppet assembly to move to a full open position under very little pressure increase over that required for initial opening.

Of primary concern in the application for which this device was made is the necessity for protecting spring 40 and seals 56 and 58 to thereby assure proper calibration of the relief valve. An essential part of protecting spring 40 and seals 56 and 58 is the maintenance of minimal leakage past seals 56 and 58 to thereby provide assurance that the gas in the chamber containing spring 40 will be essentially static. After the initial gas flows from orifices 24 into chamber 26 and through the path defined by cylindrical member 34 and baffle member 50, there is no real outlet for this gas and therefore no substantial addition to the chamber. The insulating sleeves 36 and 54, which may be of polytetrafluoroethylene material, tend to cause the heat in the members 34 and 50, respectively, to flow into cap 48 where it is dissipated to the outside of the valve member. The spring 40 is further protected by interposing asbestos gaskets between itself and the annular retainer members 38 and 52.

While only one embodiment has been shown and described herein, it is recognized that numerous modifications may be made within the scope of the present invention.

I claim:

1. A hot gas relief valve comprising a casing defining an inlet passage extending inwardly from the exterior of the casing and defining a valve seat element at the inner end of said passage and an outlet passage extending from said seat element to the exterior of said casing;

a poppet element within said casing movable between open and closed positions with respect to said seat element to interconnect and disconnect said passages respectively;

said elements having cooperating annular contact portions contacting each other when said poppet is in its said closed position;

said poppet element comprising an outer portion remote from said contact portion including a cylindrical member open at its outer end and connected with said contact portion at its inner end by flow-restricting means, said cylindrical member having a radially extending spring-retaining surface and being at least partially coated with a layer of heat-insulating material;

a cap member adjustably fastened to said casing including an annular spring-retaining surface and a cylindrical baffle member of high heat transfer material substantially enclosing said cylindrical member and cooperating therewith to provide an elongated path for gas flow between said inlet passage and the exterior of said cylindrical baffle member; and a spring interposed between said spring-retaining surfaces whereby the inlet gas pressure tending to open said poppet element is opposed by gas pressure acting against said outer portion and the force of said spring.

2. A relief valve as set forth in claim 1 wherein said adjustable cap member is threadedly engaged with said casing and is thereby capable of varying the force of said spring.

3. A relief valve as set forth in claim 1 wherein said poppet element includes a fluid-deflecting surface extending laterally from its annular contact portion across said seat element whereby gas flowing across said seat is directed such that a reactive component is produced tending to open said poppet element.

4. A hot gas relief valve as set forth in claim 1 wherein said poppet element includes a partially spherical surface on its outer portion and a piston member is provided having a mating, partially spherical surface in contact with said poppet member, said piston member being retained in slidable engagement with the interior of said cap member.

5. A hot gas relief valve comprising a casing defining an inlet passage extending inwardly from the exterior of the casing and defining a valve seat element at the inner end of said passage and an outlet passage extending from said seat element to the exterior of said casing;

a poppet element within said casing movable between open and closed positions with respect to said seat element to interconnect and disconnect said passages respectively, said poppet element including an inner contact portion and an outer portion including a cylindrical member open at its outer end and connected with said contact portion at its inner end by flow restriction means;

a cap member fastened to said housing including a cylindrical baffle substantially enclosing said cylindrical member and cooperating therewith to provide an elongated path for gas flow between said inlet passage and the exterior of said cylindrical baffle member; and resilient means interposed between said poppet element and said cap member whereby the inlet gas pressure acting on said inner contact portion is opposed by the gas pressure acting against said outer portion plus the force exerted by said resilient means.

6. A hot gas relief valve comprising a casing defining an inlet passage extending inwardly from the exterior of the casing and defining a valve seat element at the inner end of said passage and an outlet passage extending from said seat element to the exterior of said casing;

a cap member threadedly engaged with said casing including an annular spring-retaining surface and a cylindrical baffle member of high heat transfer material positioned concentrically within said spring-retaining surface, said baffle member having its outside surface at least partially coated with a layer of heat-insulating material;

a poppet element within said casing movable between open and closed positions with respect to said seat element to interconnect and disconnect said passages respectively, said poppet element including an inner contact portion and an outer portion having a partially spherical surface;

a piston member slidably engaged with the inner surface of said cap member and having a partially spherical surface mating with the spherical surface on said outer portion;

a cylindrical member carried on said poppet element open at its outer end and connected with said contact portion at its inner end by flow-restricting means, said cylindrical member including a radially extending spring-retaining surface and being at least partially coated with a layer of heat-insulating material and concentrically positioned within said cylindrical baffle member and cooperating therewith to provide an elongated path for gas flow between said inlet passage and the exterior of said cylindrical baffle member; and a spring interposed between said spring-retaining surfaces whereby the inlet gas pressure acting against said inner contact portion of said poppet element and tending to open said element is opposed by gas pressure acting against said piston and said cylindrical member plus the force of said spring.

7. A relief valve as set forth in claim 6 wherein said poppet element includes a fluid-deflecting surface extending laterally from its annular contact portion across said seat element whereby gas flowing across said seat is directed such that a reactive component is produced tending to open said poppet element.

8. A hot gas relief valve as set forth in claim 6 wherein sealing means are carried on said piston member and on said cap member for providing a high temperature sliding seal between said piston member and said cap member.

9. A hot gas relief valve comprising a casing defining an inlet passage extending inwardly from the exterior of the casing and defining a valve seat element at the inner end of said passage and an outlet passage extending from said seat element to the exterior of said casing;

a cap member adjustably fastened to said casing including a cylindrical baffle member of material having rapid heat transfer properties;

a poppet member within said casing movable between open and closed positions with respect to said seat element to interconnect and disconnect said passages respectively, said poppet element including an inner contact portion and an outer portion including a piston member slidably engaged with the inner surface of said cap member and a cylindrical member open at its outer end connected with said contact portion at its inner end by flow-restricting means, said cylindrical member being concentrically positioned within said cylindrical baffle member and cooperating therewith to provide an elongated path for gas flow between said inlet passage and the exterior of said cylindrical baffle member; and resilient means positioned between said piston section and said cylindrical baffle member urging said poppet member against said seat element, whereby the gas pressure in said inlet passage acting against said contact portion is opposed by the gas pressure acting against said outer portion and the force exerted by said resilient means.

10. A hot gas relief valve as set forth in claim 9 wherein said poppet element includes a fluid-deflecting surface extending laterally from its annular contact portion across said seat element whereby gas flowing across said seat is directed such that a reactive component is produced tending to open said poppet element.

11. A hot gas relief valve as set forth in claim 9 wherein the outer portion of said poppet member includes a partially spherical surface and centering means and said piston member includes a mating, partially spherical surface and centering means mating with that on said poppet member, and an insulating barrier is provided between said partially spherical surfaces.

No references cited.

M. CARY NELSON, *Primary Examiner.*

H. KLINKSIEK, *Assistant Examiner.*